United States Patent
Phinisee et al.

(10) Patent No.: US 11,702,044 B2
(45) Date of Patent: Jul. 18, 2023

(54) VEHICLE SENSOR CLEANING AND COOLING

(71) Applicant: Ford Global Technologies, LLC, Dearborn, MI (US)

(72) Inventors: Rashaun Phinisee, Ypsilanti, MI (US); Venkatesh Krishnan, Canton, MI (US); Ashwin Arunmozhi, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 316 days.

(21) Appl. No.: 17/113,599

(22) Filed: Dec. 7, 2020

(65) Prior Publication Data

US 2022/0176917 A1 Jun. 9, 2022

(51) Int. Cl.
| | |
|---|---|
| *G06N 3/08* | (2023.01) |
| *B60S 1/56* | (2006.01) |
| *H04W 4/44* | (2018.01) |
| *H04N 7/18* | (2006.01) |
| *G08G 1/0967* | (2006.01) |
| *G06F 18/24* | (2023.01) |
| *G01S 7/497* | (2006.01) |
| *G01S 13/931* | (2020.01) |
| *G01S 17/931* | (2020.01) |
| *G01S 7/40* | (2006.01) |

(52) U.S. Cl.
CPC ............... *B60S 1/56* (2013.01); *G06F 18/24* (2023.01); *G06N 3/08* (2013.01); *G08G 1/0967* (2013.01); *H04N 7/185* (2013.01); *H04W 4/44* (2018.02); *G01S 7/4043* (2021.05); *G01S 13/931* (2013.01); *G01S 17/931* (2020.01); *G01S 2007/4977* (2013.01)

(58) Field of Classification Search
CPC . B60S 1/56; H04W 4/44; G06F 18/24; G06N 3/08; G08G 1/0967; H04N 7/185; G01S 17/931; G01S 7/4043; G01S 13/931; G01S 2007/4977
See application file for complete search history.

(56) References Cited

U.S. PATENT DOCUMENTS

| | | |
|---|---|---|
| 9,108,596 B2 | 8/2015 | Stratton |
| 10,421,439 B2 | 9/2019 | Hansen et al. |
| 2019/0064798 A1 | 2/2019 | Anderson |
| 2019/0322245 A1 | 10/2019 | Kline et al. |

FOREIGN PATENT DOCUMENTS

WO 2019141665 A1 7/2019

*Primary Examiner* — Mathew Franklin Gordon
(74) *Attorney, Agent, or Firm* — Frank A. MacKenzie; Bejin Bieneman PLC (57) ABSTRACT

Data about operating parameters external to a vehicle can be input to a neural network that outputs at least one profile defining at least one of a cleaning protocol or a cooling protocol for a vehicle sensor, wherein the operating parameters include one or more of current weather conditions, future weather conditions, images indicative of a current weather condition, city infrastructure, duration of a route to be traversed, a time period to traverse the route, and vehicle location. Operation of at least one of a cleaning device or a cooling device can be initiated according to the at least one of the cleaning protocol or the cooling protocol when the operating parameters to the at least one profile.

20 Claims, 9 Drawing Sheets

VEHICLE SENSOR CLEANING AND COOLING

BACKGROUND

Vehicles may increasingly employ vehicle-to-vehicle (V2V) and vehicle-to-infrastructure (V2I) communications, collectively known as V2X, for communication purposes. For example, V2X communications include one or more communication networks in which vehicles and roadside devices are the communicating nodes that provide one another with information, such as safety warnings and traffic information. V2X communications allow vehicles to communicate with other vehicles, infrastructure, and/or pedestrians, using wireless communications technologies, such as, but not limited to, Dedicated Short Range Communications (DSRC).

Intelligent transportation systems (ITS) can use V2X services within and/or around intersection environments, such as signalized intersection environments. For example, the V2X services may use survey level map representations of the intersections to allow vehicles to locate themselves with respect to other vehicles and within a roadway. Vehicles and other devices within the environment may broadcast Basic Safety Messages to surrounding devices and/or vehicles for collaborative motion planning and decision making.

Vehicles can employ perception algorithms, or agents, to perceive the environment around the vehicle. These vehicles can employ multiple sensors for perceiving aspects of the surrounding environment. The perception algorithms use the sensor data to determine whether one or more vehicle actions should be modified based on the sensor data. For example, the perception algorithms may update a routing algorithm such that the vehicle alters course based on a sensed object within the environment. Vehicles can include camera sensors, radar sensors, and lidar sensors. Sensors can require various operating conditions to provide reliable data, e.g., a temperature of a sensor should be within a certain range, a sensor lens should be substantially unoccluded, etc.

DETAILED DESCRIPTION

The present disclosure includes systems and methods for cleaning and/or cooling vehicle sensors. Vehicles can include multiple sensors for perceiving an environment around the vehicle that may experience overheating and/or become obstructed when traversing various environments. For example, a camera lens of a sensor may become obstructed from snow, ice, salt, dirt, dust, mud, or the like, which may reduce sensor functionality. The systems and methods discussed herein can determine whether a sensor may need cleaning and/or cooling. In one example, the systems and methods discussed herein may use profiles for sets of vehicle operating parameters including data about conditions external to the vehicle, such as environmental conditions, a planned route, etc., that define cleaning and/or cooling protocols for preventative purposes.

A system includes a computer including a processor and a memory. The memory includes instructions such that the processor is programmed to input data about operating parameters external to a vehicle to a neural network that outputs at least one profile defining at least one of a cleaning protocol or a cooling protocol for a vehicle sensor, wherein the operating parameters are data that includes one or more of current weather conditions, future weather conditions, images indicative of a current weather condition, city infrastructure, duration of a route to be traversed, a time period to traverse the route, and vehicle location; and initiate operation of at least one of a cleaning device or a cooling device according to the at least one of the cleaning protocol or the cooling protocol when the operating parameters correspond to the at least one profile.

In other features, the processor is further programmed to determine, via a deep neural network, whether a pixel obstruction value of an image frame is greater than or equal to a pixel obstruction threshold; and initiate operation of a cleaning device according to a pixel obstruction cleaning protocol when the pixel obstruction value is greater than or equal to the pixel obstruction threshold.

In other features, the processor is further programmed to determine the pixel obstruction value by calculating a number of pixels that are classified as obstructed or at least partially obstructed.

In other features, the deep neural network comprises a convolutional neural network.

In other features, the system includes a sensor assembly including an image sensor, wherein the image sensor generates the image frame.

In other features, the sensor assembly is disposed over a roof of a vehicle.

In other features, the image sensor comprises an electronic depth camera.

In other features, the processor is further programmed to initiate operation of at least one of the cleaning device or the cooling device according to an unknown environment cleaning protocol when the vehicle location does not correspond to the at least one profile.

In other features, the processor is further programmed to determine whether the vehicle location corresponds to at least one profile by cross-referencing a current location of the vehicle with corresponding map coordinates; and determine an environment the vehicle is traversing based on map metadata corresponding to the map coordinates.

In other features, the processor is further programmed to receive the image frame from a V2X device.

In other features, the V2X device comprises a vehicle-to-infrastructure (V2I) device.

A method includes inputting data about operating parameters external to a vehicle to a neural network that outputs at least one profile defining at least one of a cleaning protocol or a cooling protocol for a vehicle sensor, wherein the operating parameters are data that includes one or more of current weather conditions, future weather conditions, images indicative of a current weather condition, city infrastructure, duration of a route to be traversed, a time period to traverse the route, and vehicle location; and initiating operation of at least one of a cleaning device or a cooling device according to the at least one of the cleaning protocol or the cooling protocol when the operating parameters to the at least one profile.

In other features, the method further includes determining, via a deep neural network, whether a pixel obstruction value of an image frame is greater than or equal to a pixel obstruction threshold; and initiating operation of a cleaning device according to a pixel obstruction cleaning protocol when the pixel obstruction value is greater than or equal to the pixel obstruction threshold.

In other features, the deep neural network comprises a convolutional neural network.

In other features, the method further includes initiating operation of at least one of the cleaning device or a cooling device according to an unknown environment cleaning protocol when the vehicle location does not correspond to the at least one profile.

In other features, the particular environment comprises at least one of: a time of year, a duration of a route of the vehicle, or current weather condition.

In other features, the method further includes determining whether the vehicle location corresponds to at least one profile by cross-referencing a current location of the vehicle with corresponding map coordinates; and determining the operating parameters based on map metadata corresponding to the map coordinates.

In other features, the method further includes receiving the image frame from a V2X device.

In other features, the V2X device comprises a vehicle-to-infrastructure (V2I) device.

Figure 1:
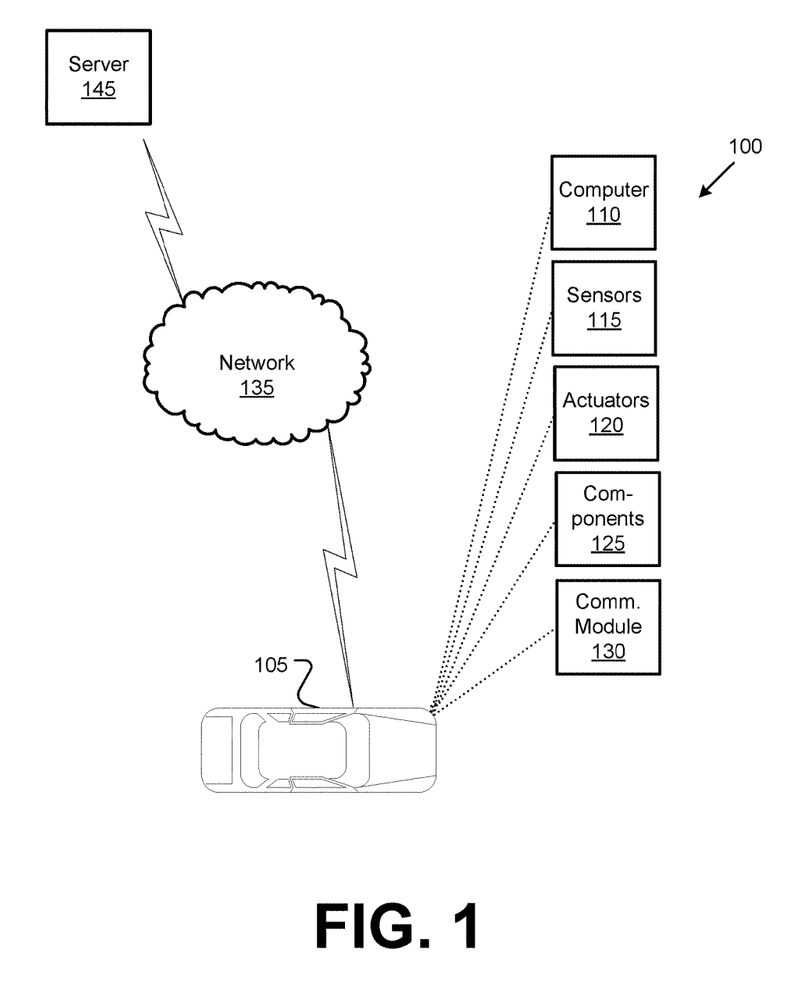
FIG. 1 is a diagram of an example vehicle system.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105. The vehicle sensors 115 may also include inertial measurement units (IMUs) that measure force, angular rate, and/or an orientation associated with the vehicle 105.

The vehicle sensors 115 may comprise active sensors and/or passive sensors. Active sensors, such as lidar and radar sensors, project energy into a surrounding environment and use measured energy reflections to interpret and/or classify objects within the environment. Passive sensors, such as cameras, detect phenomena without projecting energy for the purposes of interpretation and/or classification. A sensor may include optical elements for the purposes of steering, directing, and/or detecting electromagnetic radiation, e.g., light, for transmission and/or receiving purposes. In some instances, errors or changes in optics may affect a perceived image and/or point cloud received.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
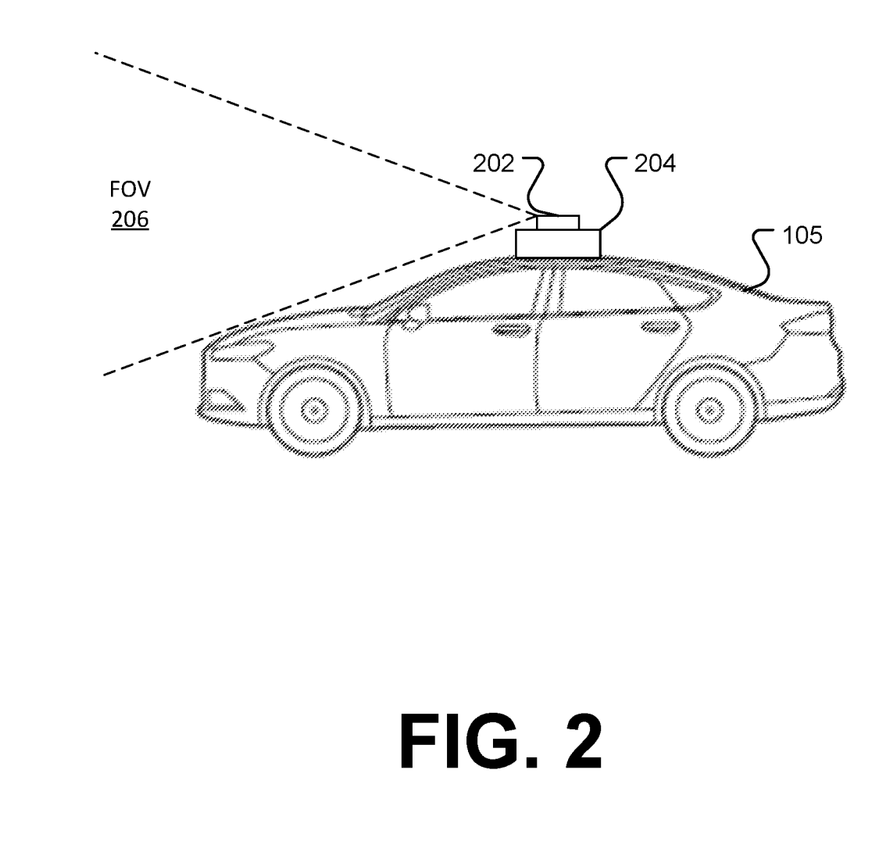
FIG. 2 is a diagram of an example vehicle including an sensor assembly.

FIG. 2 illustrates an example sensor assembly 202 attached to the vehicle 105. As shown, the sensor assembly 202 may be positioned over a roof of the vehicle 105. However, the sensor assembly 202 may be located about the vehicle 105 in other implementations. As explained in greater detail below, the sensor assembly 202 includes one or more sensors 115 that captures two-dimensional (2-D) images and/or three-dimensional (3-D) depth images within a field of view (FOV) 206 about an environment of the vehicle 105. The sensor assembly 202 can include a housing 204 that houses, e.g., contains, the various components of the sensor assembly 202. In one or more implementations, the housing 204 may comprise a fiber composite structure, a space frame structure, or the like.

As the vehicle 105 traverses a path, e.g., a roadway, one or more sensors 115 in or on the sensor assembly 202 capture images of an environment. For instance, the sensor assembly 202 may include sensors 115 that capture images, e.g., 2-D images and/or 3-D images, including depictions of possible objects of interest within the path of the vehicle 105. The images are provided to the computer 105 such that the computer 105 can classify objects within the image and actuate the vehicle 105 in response to the classification. For example, the computer 105 can use machine learning processes, such as object recognition and/or image classification, to determine potential objects of interest within a field-of-view (FOV) 206, e.g., as illustrated a conic volume extending from a camera sensor 115 lens, but possibly other shapes extending in one or more other directions about the vehicle 105 (e.g., a lidar can have a 360 degree field of view), of the sensor assembly 202. Potential objects of interest include, but are not limited to: pedestrians, roadway lanes, other vehicles, and/or street signs.

Figure 3:
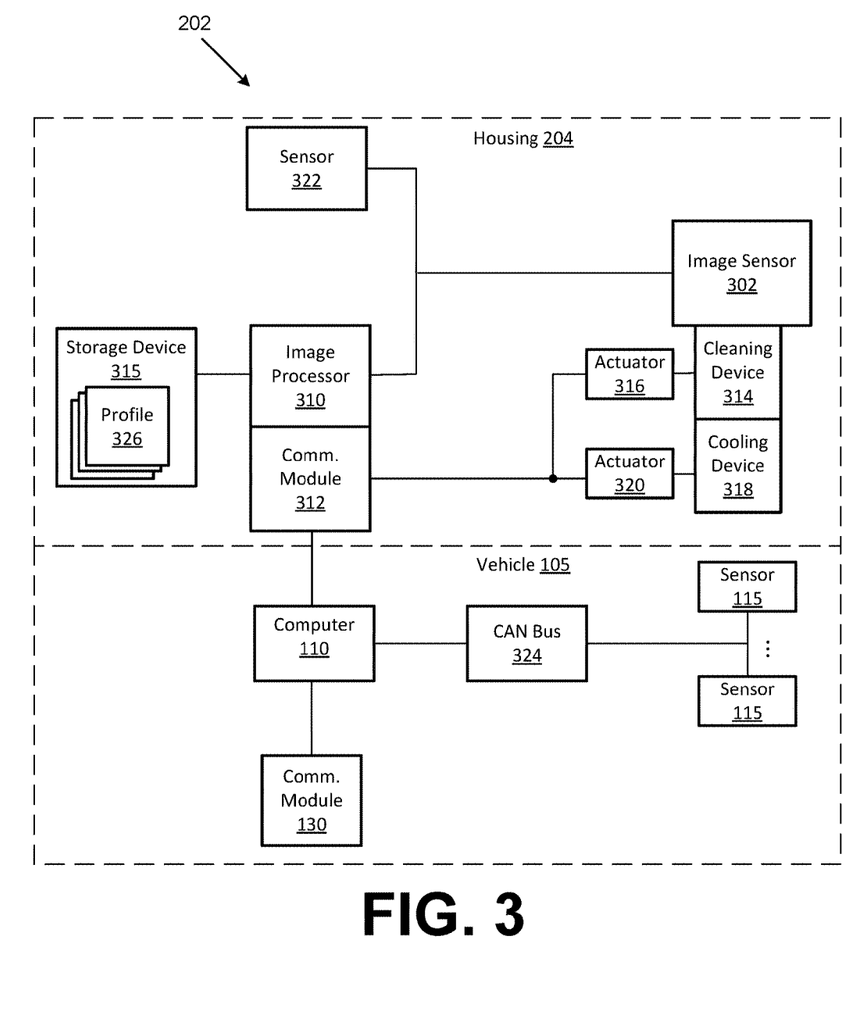
FIG. 3 is a block diagram of an example sensor assembly.

FIG. 3 is a block diagram illustrating an example sensor assembly 202 according to an example implementation. The sensor assembly 202 is communicatively connected to the computer 110 and the sensors 115 within the sensor assembly 202 include one or more image sensors 302, e.g., sensors 115. In an example implementation, the image sensor 302 may comprise one or more electronic depth cameras, such as red-green-blue-depth (RGBD) cameras that capture 2-D image data and 3-D image data. Non-limiting commercial examples of RGBD cameras comprise the Astra S 3D Camera by Orbbec and the Realsense D435 by Intel; other examples exist.

The image sensor 302 can project electromagnetic radiation into the FOV 206 and measures the reflected electromagnetic radiation. Processors, such as an image processor 310, associated with the image sensor 302 use the measured return times and wavelengths to generate a three-dimensional representation of one or more objects within the FOV 206. The three-dimensional representation may be a point cloud representing the objects detected within the FOV 206 of the vehicle 105.

The sensor assembly 202 also includes the image processor 310, which may comprise one or more microprocessor-based, DSP-based, ASIC-based, and/or FPGA-based circuits. In an implementation, the image processor 310 comprises digital processing circuitry that performs image processing for images as captured by the image sensor 302. The image processor 310 can perform multi-view image processing, such as generating depth maps and determining ranges to objects within the imaged scene.

The image processor 310 typically receives successive images, also referred to as "frames," from the image sensor 302. Here, a "frame" or "image" comprises the image data, e.g., pixel data, from the image sensor for a given image capture. In one or more embodiments, the image processor 310 includes or is associated with a storage device 315. The storage device 315 can be a computer-readable medium, e.g., FLASH memory or EEPROM, that provides non-transitory storage for a computer program. The image processor 310 is adapted to carry out the corresponding processing taught herein based on its execution of computer program instructions.

The computer 110 can store one or more profiles 326 that each specify a cleaning and/or cooling protocol for a set of external operating parameters, i.e., data about physical phenomena sensed or planned for the vehicle, e.g., environmental data such as weather conditions, a planned route, a geographic location of the vehicle, etc., and thus can, when a profile 326 is output as a selected profile from a DNN 500 (discussed below) specify a cleaning and/or cooling protocol for a set of external operating parameters input to the DNN 500. The operating parameters typically include data about current conditions around the vehicle 105, and can include a time of year, a time and/or a duration of a route being traversed by the vehicle 105, current weather conditions, and/or vehicle location, e.g., located within a city or rural environment. The cleaning and/or cooling protocols specify a process to clean or cool a sensor 115, and include parameters, i.e., values governing the process, that can include an amount of fluid to disperse, a wiper duration, a cooling period, and/or a cooling frequency. The cleaning and/or cooling protocols further can define a duty cycle for operating a cleaning device and/or a cooling device, a pulse-width-modulation for the cleaning device and/or the cooling device, or the like, which are described in greater detail below. As discussed below, the profiles 326 can be generated by a neural network trained for particular environments commonly traversed by the vehicle 105, e.g., urban environment, rural environment, etc. The computer 110 can determine whether the vehicle 105 is traversing an urban environment or a rural environment based on a current location of the vehicle 105. For instance, the computer 110 can cross-reference the vehicle's 105 current location with map data. The map data can include metadata indicating whether the vehicle's 105 current location corresponds to an urban environment or a rural environment. Once trained, the neural network can receive a set of environmental data from external and internal sensors and output a profile 326 that specifies the cleaning and/or cooling protocols for the set environmental data. In various implementations, the image processor 310 transmits image frame data to the computer 110 so that the computer 110 can perform the functions described herein.

The sensor assembly 202 further includes a communication module 312 that communicatively connects the computer 110 to the sensor assembly 202, thereby allowing the sensor assembly 202 to provide image data and/or derived object detection data to the computer 110, and allowing the computer 110 to provide the sensor assembly 202 with computer-readable instructions. The communication module 312 could include one or more mechanisms by which the sensor assembly 202 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communication module 312 include a vehicle network and/or a vehicle bus, such as a controller area network (CAN) bus 324 or the like.

As shown, the sensor assembly 202 also includes a cleaning device 314 that is connected to an actuator 316 that operates the cleaning device 314. The cleaning device 314 can wipe or clean a camera lens of the image sensor 302. In one or more implementations, the cleaning device 314 comprises wipers, air blowers, fluid dispenser, e.g., fluid sprayer, or the like, and can be operated according to one or more cleaning protocols as described below. As discussed further herein, once an obstruction or potential obstruction is detected, such as dirt, debris, and/or liquid, the cleaning device 314 is actuated to remove or mitigate the obstruction or potential obstruction. The obstruction or potential obstruction may be snow, ice, salt, dirt, dust, mud, and/or other debris that can cover or partially cover the image sensor 302, such as a lens of the image sensor 302. For example, the wiper of the cleaning device 314 can be actuated to remove or mitigate the obstruction or potential obstruction. In another example, the air blower of the cleaning device 314 can be actuated to remove or mitigate the obstruction or potential obstruction via compressed air. In yet another examples, the fluid dispenser may dispense fluid to remove or mitigate the obstruction or potential obstruction.

The sensor assembly 202 can also include a cooling device 318 that is connected to an actuator 320. The cooling device 318 may comprise a fan that selectively provides airflow within the sensor assembly 202 to mitigate overheating of the image sensor 302 and/or other sensor assembly 202 components.

The actuators 316, 320 can be in communication with the communication module 312 and receive operational commands from the communication module 312. For instance, based on sensor data, the computer 110 and/or the image processor 310 may send a signal to communication module 312 to operate one or both of the cleaning device 314 and the cooling device 318.

A sensor 322 positioned within the housing 206 can monitor one or more conditions associated with the sensor assembly 202. The sensor 322 may be attached to an interior surface of the housing 206. For instance, the sensor 322 may be mounted to the interior surface with fasteners, brackets, or the like. In an example implementation, the sensor 322 may measure a temperature within the housing 206 and provide signals indicative of the temperature to the image processor 310. If the temperature is greater than a temperature threshold, the image processor 310 can provide one or more signals to the communication module 312 to initiate the cooling device 318. The computer 110 may also provide one or more signals to the communication module 312. The computer 110 may provide the signals based on external data provided to the vehicle 105 via the communication module 130. The computer 110 may also provide signals based on sensor data from one or more sensors 115. The one or more sensors 115 can provide sensor data to the computer 110 via the controller area network (CAN) bus 324. Based on the sensor data, the computer 110 can determine whether an obstruction and/or potential obstruction is obstructing a view of the sensor 115.

Figure 4:
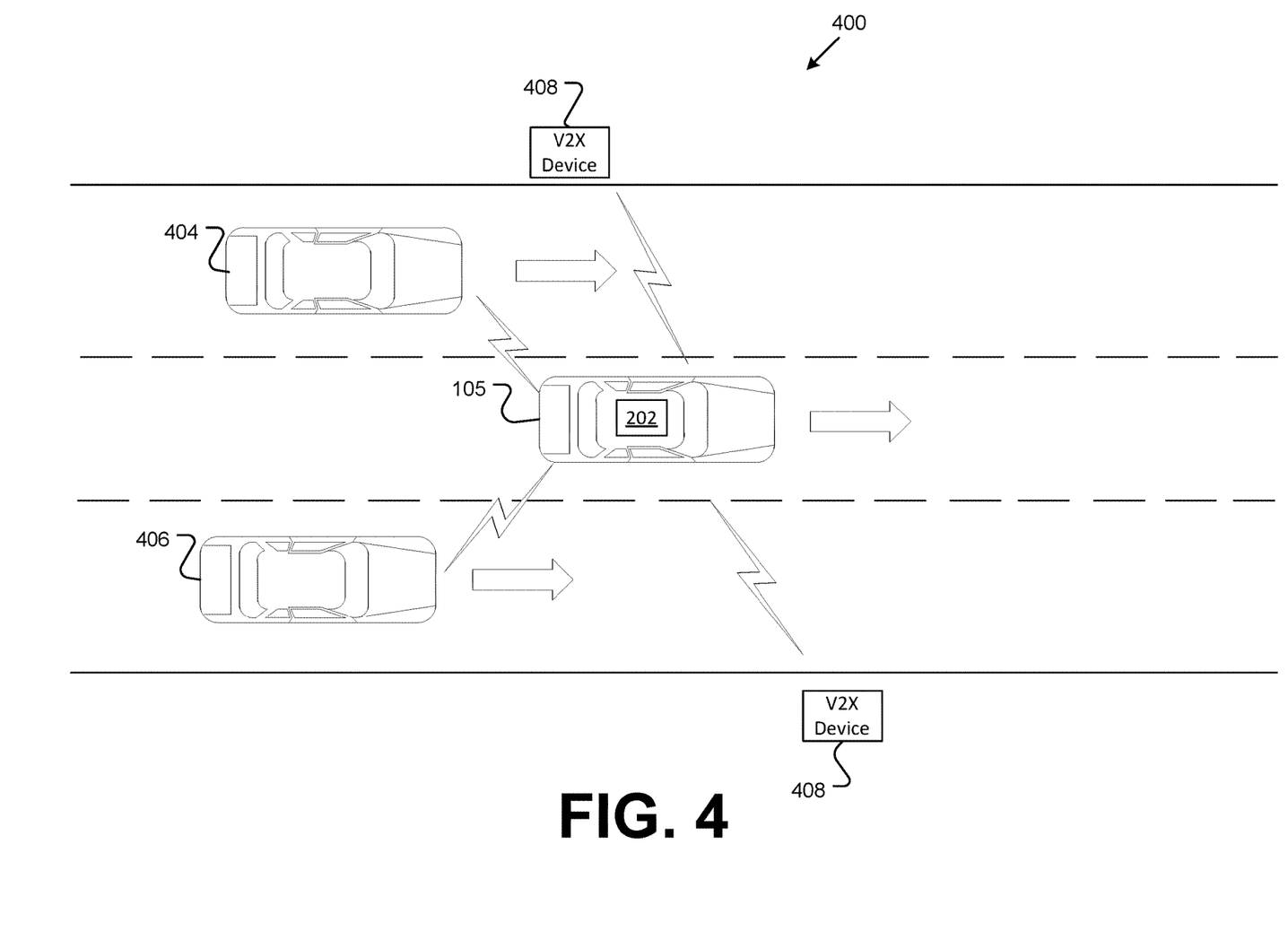
FIG. 4 is a diagram of an example environment including a vehicle traversing a roadway and in communication with one or more communication nodes.

FIG. 4 illustrates an example environment 400 of the vehicle 105 traversing a roadway 402. As shown, multiple other vehicles 404, 406 may also be traversing the roadway 402. The example environment 400 also includes one or more stationary V2X devices 408, 410. It is to be understood that the environment 400 may include fewer or additional V2X devices 408, 410. The V2X devices 408, 410 may comprise roadside devices, traffic lights, cameras attached to structures, or any other Vehicle-to-Infrastructure (V2I) devices. The V2X devices 408, 410 can include a microprocessor-based computer and a communication module.

The vehicle 105 can communicate with the vehicles 404, 406 and/or the V2X devices 408, 410 within the environment 400. For example, as the vehicle 105 traverses the roadway 402, the vehicle 105 can receive data from other vehicles 404, 406 and/or V2X devices 408, 410 by way of the server 145. In this example, the vehicles 404, 406, and/or V2X device 408, 410 upload data to the server 145 via the communication network 135. The vehicle 105 can receive the data captured by the vehicles 404, 406 and/or V2X devices 408, 410 from the server 145 via the communication network 135. For instance, based on a predetermined distance between the vehicle 105 and the vehicles 404, 406 and/or V2X devices 408, 410 (which, when within the predetermined distance of each other, are said to be in proximity to each other), the server 145 can transmit the data to the computer 110. The data can provide information about a surrounding environment, such as other vehicles within the environment, or the like. The data can also provide information regarding possible obstructions within a FOV of the image sensor 302 as described in greater detail below.

Figure 5:
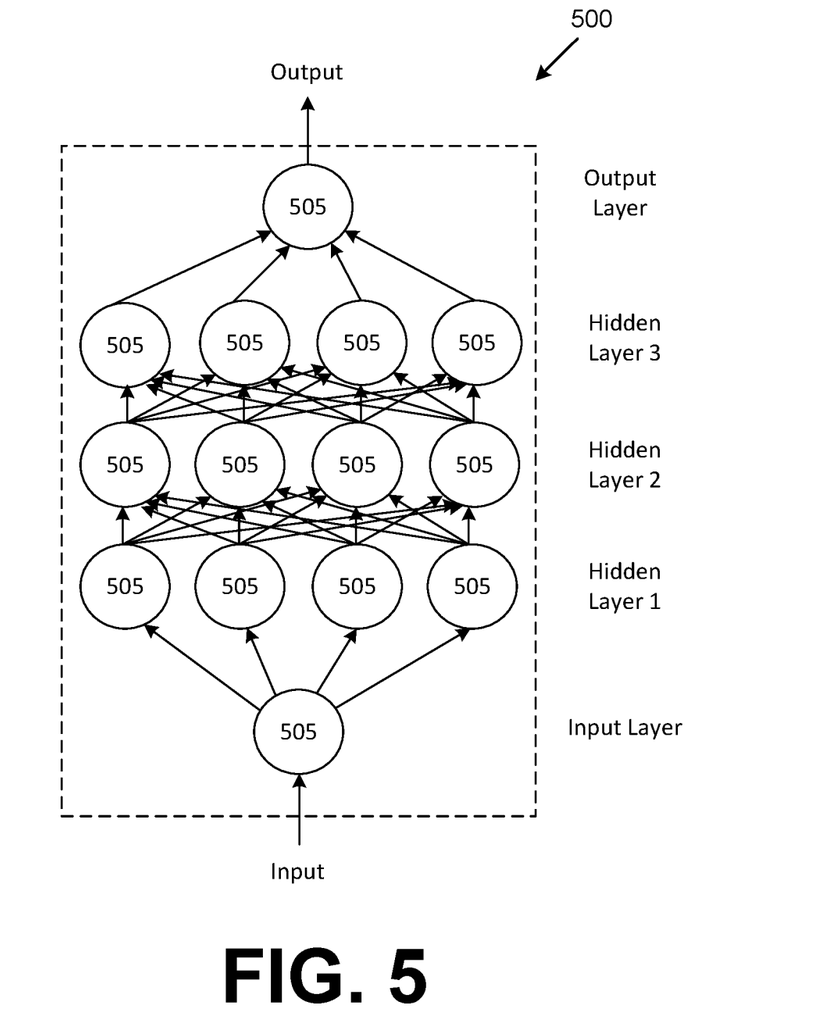
FIG. 5 is a diagram of an example deep neural network that can be trained to detect an obstructed or overheated sensor.

The server 145, the computer 110, and/or the image processor 310 can access a deep neural network (DNN) 500 that determines the presence or the absence of an obstruction and/or a potential obstruction. FIG. 5 is a diagram of an example deep neural network (DNN) 500. The DNN 500 may be representative of one or more neural networks described herein. The DNN 500 includes multiple nodes 505, and the nodes 505 are arranged so that the DNN 500 includes an input layer, one or more hidden layers, and an output layer. Each layer of the DNN 500 can include a plurality of nodes 505. While FIG. 5 illustrates three (3) hidden layers, it is understood that the DNN 500 can include additional or fewer hidden layers. The input and output layers may also include more than one (1) node 505.

The nodes 505 are sometimes referred to as artificial neurons 505, because they are designed to emulate biological, e.g., human, neurons. A set of inputs (represented by the arrows) to each neuron 505 are each multiplied by respective weights. The weighted inputs can then be summed in an input function to provide, possibly adjusted by a bias, a net input. The net input can then be provided to activation function, which in turn provides a connected neuron 505 an output. The activation function can be a variety of suitable functions, typically selected based on empirical analysis. As illustrated by the arrows in FIG. 5, neuron 505 outputs can then be provided for inclusion in a set of inputs to one or more neurons 505 in a next layer.

The DNN 500 can be trained to accept data as input and generate an output based on the input. The DNN 500 can be trained with ground truth data, i.e., data about a real-world condition or state. For example, the DNN 500 can be trained with ground truth data or updated with additional data by a processor. Weights can be initialized by using a Gaussian distribution, for example, and a bias for each node 505 can be set to zero. Training the DNN 500 can including updating weights and biases via suitable techniques such as back-propagation with optimizations. Ground truth data can include, but is not limited to, data specifying objects within an image or data specifying a physical parameter, e.g., angle, speed, distance, or angle of object relative to another object. For example, the ground truth data may be data representing objects and object labels, such as obstructions and/or potential obstructions.

Figure 6:
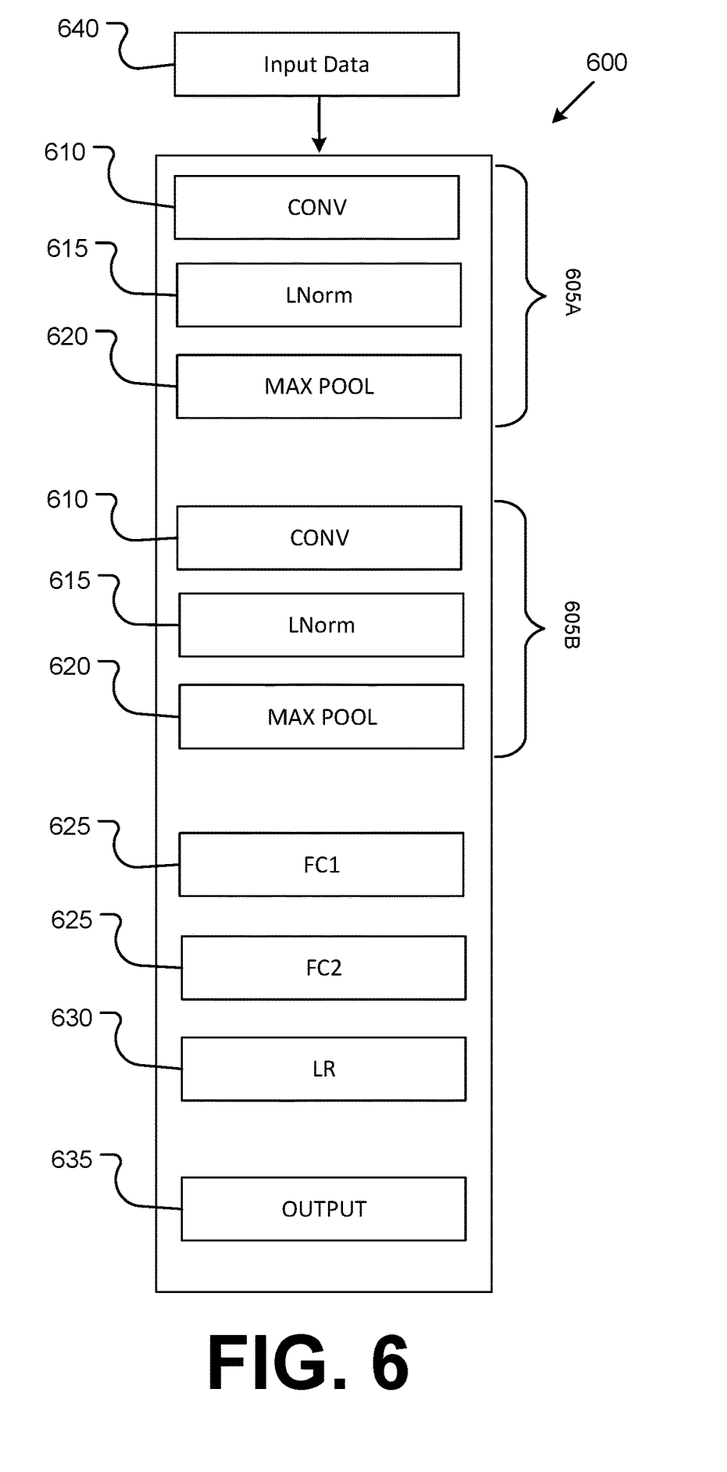
FIG. 6 is a diagram of the deep neural network of FIG. 5 implemented as a convolutional neural network.

FIG. 6 is a block diagram illustrating an example of an implementation of a. DNN 500. In the implementation illustrated in FIG. 6, the DNN 500 is a convolutional neural network 600. The convolutional neural network 600 may include multiple different types of layers based on connectivity and weight sharing. As shown in FIG. 6, the convolutional neural network 600 includes convolution blocks 605A, 605B. Each of the convolution blocks 605A, 605B may be configured with a convolution layer (CONV) 610, a normalization layer (LNorm) 615, and a max pooling layer (MAX POOL) 620.

The convolution layers 610 may include one or more convolutional filters, which are be applied to the input data 640 to generate an output 635. While FIG. 6 illustrates only two convolution blocks 605A, 605B, the present disclosure may include any number of the convolution blocks 605A. 605B. The normalization layer 615 may normalize the output of the convolution filters. For example, the normalization layer 615 may provide whitening or lateral inhibition. The max pooling layer 620 may provide doyen-sampling aggregation over space for local invariance and dimensionality reduction.

The convolutional neural network 600 may also include one or more fully connected layers 625 (FC1 and FC2). The convolutional neural network 600 may further include a logistic regression (LIZ) layer 630. Between each layer 610, 615, 620, 625, 630 of the convolutional neural network 600 are weights that can be updated. The output of each of the layers (e.g., 610, 615, 620, 625, 630) may serve as an input of a succeeding one of the layers (e.g., 610, 615, 620, 625, 630) in the convolutional neural network 600 to learn object detections from input data 640 images, audio, video, and/or sensor data, provided at the first of the convolution blocks 605A. The output 635 of the convolutional neural network 600 can represent a detection prediction based on the input data. The detection prediction can be defined as a probability of a presence or absence of an obstruction over a sensor 115, such as the image sensor 302, of the vehicle 105. For example, the output 635 may be a set of probabilities indicative of the presence of an obstruction and/or a potential obstruction depicted within the input data. Proximity may be predetermined and based on a likelihood that the obstruction is positioned near the sensor assembly 202 in such a manner that would obstruct or partially obstruct the FOV 206.

Figure 7A:
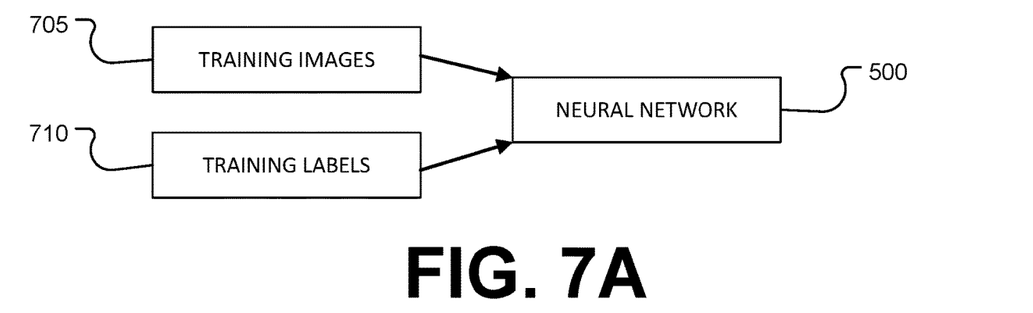
FIGS. 7A, 7B, and 7C illustrate an example process for training a deep neural network to detect an obstructed or overheated sensor.
Figure 7B:
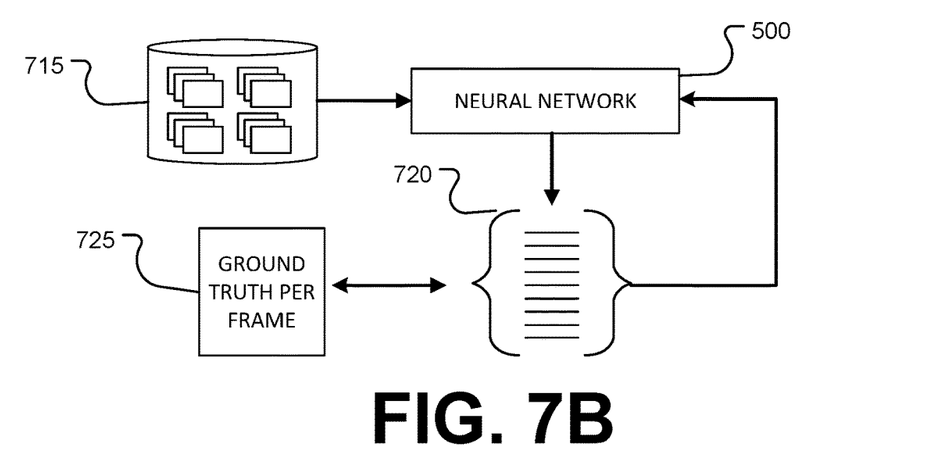

FIGS. 7A and 7B illustrate an example process for training one or more DNNs 500 for determining whether a sensor is at least partially obstructed. The one or more DNNs 500 may be implemented as a convolutional neural network, such as one or more convolutional neural networks 600, in accordance with one or more implementations of the present disclosure. FIG. 7A illustrates an initial training phase in which the DNN 500 receives a set of labeled training images, e.g., in the form of training images 705 and training labels 710 to initialize weights of the DNN 500. The training images 705 may include images that depict obstructions located over sensors and images that depict the absence of obstructions over the sensors, such as an obstruction or partial obstruction over a lens of the image sensor 302. The training images 705 may also include image frames having one or more pixels of the image frames obstructed. The training labels 710 may comprise labels indicating whether an obstruction is present or absent and/or an obstruction type, e.g., dirt, rain, etc. After the initial training phase, at a supervised training phase, a set of N testing images 715 are input to the DNN 500. The DNN 500 generates outputs indicative of an obstruction classification for each of the N testing images 715. The obstruction classification is a probability indicative of whether an obstruction is present and/or a probability indicative of whether one or more pixels of the image frames are obstructed. In an example implementation, the DNN 500 can generate a probability indicative of whether the image sensor 302 is obstructed or at least partially obstructed. In another example implementation, the DNN 500 can generate a probability value for each pixel value indicative of whether that pixel is obstructed.

FIG. 7B illustrates an example of generating output for one testing image 715, such as a non-labeled training image, of the N testing images 715. Based on the training using the testing images 715, the DNN 500 outputs a vector representation 720 of the obstruction classification. The vector representation 720 can be defined as a fixed length representation of the probabilities for each of the N testing images 715. The vector representation 720 is compared to the ground-truth data 725. The DNN 500 updates network parameters based on the comparison to the ground-truth boxes 725. For example, the network parameters, e.g., weights associated with the neurons, may be updated via back-propagation. The DNN 500 may be trained at the server 145 and provided to the vehicle 105 via the communication network 135. Back-propagation is a technique that returns outputs from the DNN 500 to the input to be compared to ground truth corresponding to the N testing images 715. In this example, during training a label and an obstruction probability can be back-propagated to be compared to the label and the obstruction probability included in the ground truth to determine a loss function. The loss function determines how accurately the DNN 500 has processed the DNN 500. The DNN 500 can be executed a plurality of times on a single input testing image 715 while varying parameters that control the processing of the DNN 500. Parameters that correspond to correct answers as confirmed by a loss function that compares the outputs to the ground truth are saved as candidate parameters. Following the test runs, the candidate parameters that produce the most correct results are saved as the parameters that can be used to program the DNN 500 during operation.

Figure 7C:
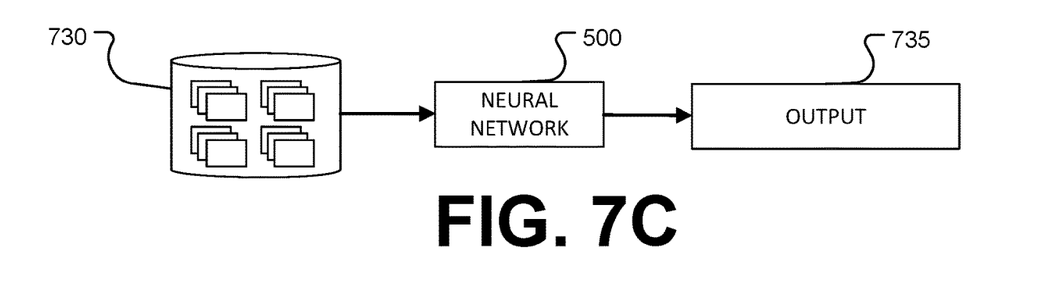

After training, the DNN 500 may be used by the vehicle computer 110 to detect and/or classify obstructions depicted within received images 730 as shown in FIG. 7C. As discussed above with reference to FIG. 6, an output 735 of the DNN 500 can be a prediction indicating a probability of the presence of an obstruction and/or a classification probability of the obstruction type. The output 735 can also be a prediction indicating a probability that one or more pixels of an image frame are obstructed. In an example implementation, the prediction can indicate that a certain percentage of pixels of the image frame are obstructed. The images 730 may comprise image data captured by various sensors 115 of the vehicle 105, the image sensor 302 of the vehicle 105, sensors of other vehicles, e.g., vehicles 404, 406, proximate to the vehicle 115, and/or V2X devices 408.

Figure 8A:
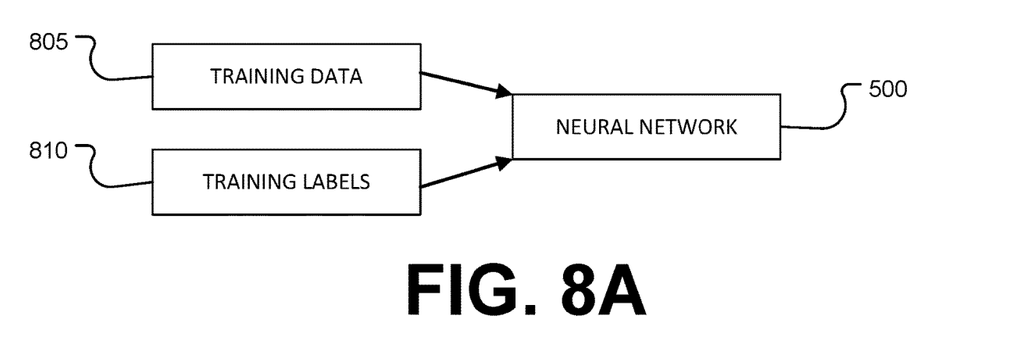
FIGS. 8A, 8B, and 8C illustrate an example process for training a deep neural network to determine whether to access a profile for implementing a cleaning and/or cooling protocol.
Figure 8B:
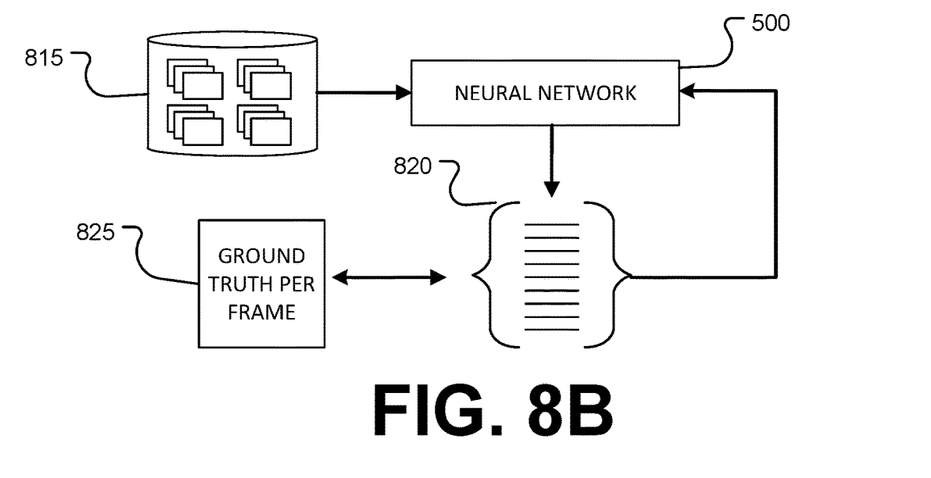

FIGS. 8A and 8B illustrate an example process for training one or more DNNs 500 for determining a cleaning and/or cooling protocol according to operating parameters. The one or more DNNs may be one or more artificial neural networks, support vector machines, decision trees, random forests, or the like, in accordance with one or more implementations of the present disclosure. FIG. 8A illustrates an initial training phase in which the DNN 500 receives a set of labeled training data, e.g., in the form of training data 805 and training labels 810, to initialize weights of the DNN 500. The training data 805 may include operating parameters such as data indicative of current weather conditions, future weather conditions, images indicative of a current weather condition, sensor assembly 202 parameters, vehicle location, duration of a route to be traversed, a time period to traverse the route, date and/or time of year to traverse the route, or the like. The current weather conditions and/or the future weather conditions can be received from the server 145, determined from the vehicle 105 sensors 115, and/or received from other vehicles 404, 406 and/or V2X devices 408. The sensor assembly 202 parameters are defined as a current temperature of the sensor assembly 202 and/or current sensor 202 operational data.

The training labels 810 may comprise labels indicating a cleaning and/or cooling protocol to implement. After the initial training phase, at a supervised training phase, a testing data set 815 is input to the DNN 500. The DNN 500 generates outputs indicative a cleaning and/or cooling protocol to implement for the testing data set 815. The cleaning and/or cooling protocol can specify a process to clean or cool a sensor 115, and include parameters, i.e., values governing the process, that can include an amount of fluid to disperse, a wiper duration, a cooling period, which sensor 115 to clean or cool, which portion of the sensor assembly 202 to clean or cool, and/or a cooling frequency. As discussed above, the cleaning device 314 can comprise wipers, air blowers, fluid dispenser, e.g., fluid sprayer, or the like. An example cleaning protocol may be defined as actuating a wiper for a defined period of time, actuating an air blower to generate an air flow for a defined period of time, and/or actuating a fluid dispenser for a defined period of time. The cooling device 318 can comprise a fan that generates airflow to cool the sensor 115, and an example cooling protocol may be defined as actuating the fan to generate an air flow for a defined period of time.

For example, a DNN 500 could be trained with a set of cleaning protocols including actuation of one or more cleaning devices 314 for various amounts of time, but no cooling. Further, a DNN 500 could be trained with a set of cooling protocols including actuation of one or more cooling devices 318 for various amounts of time, but no cleaning. Yet further, a DNN 500 could be trained with a set of cleaning protocols including actuation of one or more cleaning devices 314 and one or more cooling devices 318 for various respective amounts of time. The DNN 500 can map operating parameters to cleaning and/or cooling protocols. For example, one or more cleaning and/or cooling protocols may be stored in one or more profiles 326, and the DNN 500 can select a profile 326 to initiate the cleaning and/or cooling protocol according to the operating parameters.

FIG. 8B illustrates an example of generating output for one set of training data 805, such as a non-labeled training data set. Based on the initial training, the DNN 500 outputs a vector representation 820 of the cleaning and/or cooling protocol to implement. The vector representation 820 can be defined as a set of probabilities to initiate a cleaning and/or cooling protocol for each of the sets of training data 805. The vector representation 820 is compared to the ground-truth data 825. The DNN 500 updates network parameters based on the comparison to the ground-truth data 825. For example, the network parameters, e.g., weights associated with the neurons, may be updated via back-propagation, as described above. The DNN 500 may be trained at the server 145 and provided to the vehicle 105 via the communication network 135. The cleaning and/or cooling protocols may be grouped into baseline profiles, such as one or more profiles 326, based on similar environments encountered by the vehicle 105, e.g., vehicle location, weather conditions, etc.

Figure 8C:
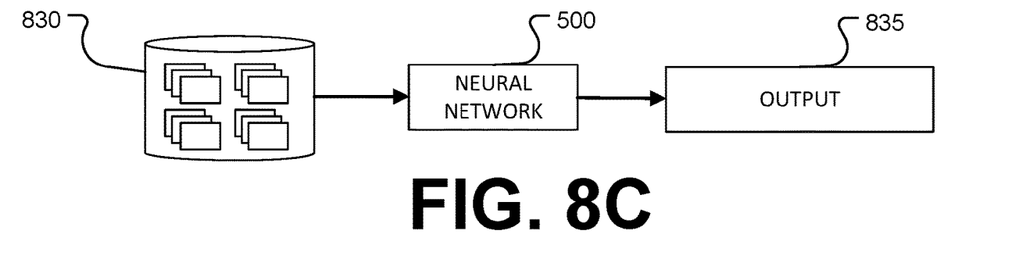

After training, the DNN 500 may be used by the vehicle computer 110 and/or image processor 310 to implement cleaning and/or cooling protocols as shown in FIG. 8C. An output 835 of the DNN 500 can be a profile 326 to access for implementing a cleaning and/or cooling protocol based on vehicle operating parameters. The vehicle operating parameters can include current weather conditions, future weather conditions, images indicative of a current weather condition, sensor assembly 202 parameters, city infrastructure, duration of a route to be traversed, a time period to traverse the route, date and/or time of year to traverse the route, and/or vehicle 105 location.

The computer 110, the image processor 310, and/or the server 145 can be programmed to implement the DNN 500. In an example implementation, the server 145 can implement the DNN 500 and transmit a command signal to the computer 110 to initiate at least one of a cleaning operation and/or a cooling operation based on the DNN 500 output, e.g., output indicating the presence of an obstruction (as discussed above with respect to FIGS. 7A through 7C), and/or the profile(s) 326 (as discussed above with respect to FIGS. 8A through 8C). In this example implementation, the computer 110 receives the command signal and transmits signals to activate the actuators 316, 320 based on the command signal. In another example implementation, the computer 110 can implement the DNN 500 and generates and transmits signals to activate the actuators 316, 320 based on the DNN 500 output. In some implementations, the computer 110 can use multiple DNNs 500 for the various classifications discussed above, e.g., use a first DNN 500 for generating a probability that the image sensor 302 is obstructed, use a second DNN 500 for generating a probability for each pixel indicating whether the pixel is obstructed, and use a third DNN 500 for determining a profile 326 to access for implementing a cleaning and/or cooling protocol.

Figure 9:
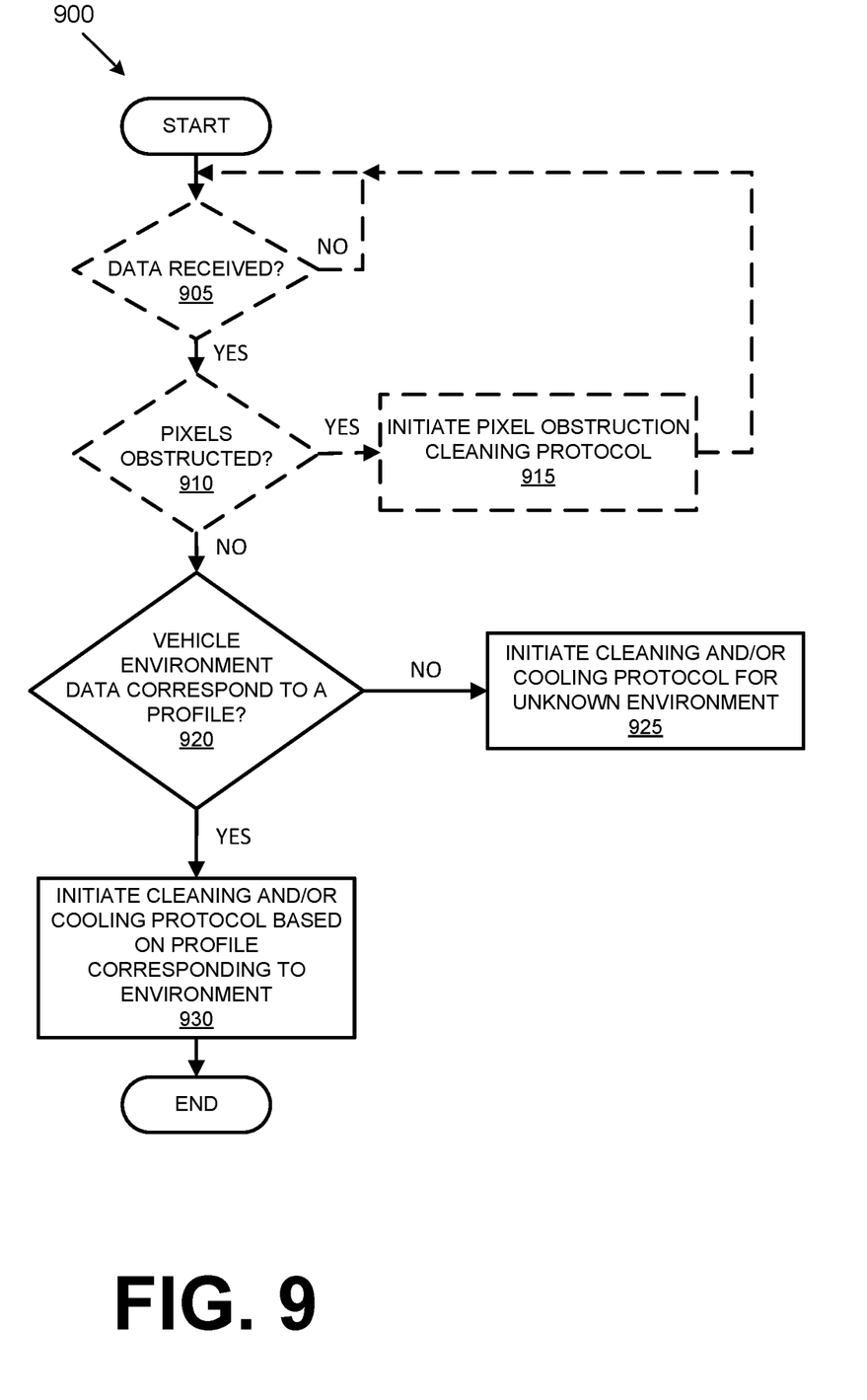
FIG. 9 is a flow diagram illustrating an example process for initiating a sensor cleaning and/or cooling operation.

FIG. 9 is a flowchart of an exemplary process 900 for initiating a sensor cleaning and/or cooling operation. In an example implementation, the process 900 can be executed for one or more sensors 115 of the vehicle 105, e.g., sensors 115 selected by a vehicle manufacturer as likely requiring cleaning and/or cooling, a particular category of sensors such as sensors with optical lenses, etc. In this implementation, a different profile 326 for cleaning and/or cooling may be provided for each sensor 115 for which the process 900 is executed, subsets of sensors 115 could be provided same profiles 326, or all sensors 115 could be provided a same profile 326. In another example implementation, the process 900 can be executed for a single sensor 115 of the vehicle 105. Blocks of the process 900 can be executed by the computer 110. The process 900 can begin at block 905 in which a determination is made of whether data has been received. The data can comprise images provided to the vehicle 105 from external data sources, e.g., V2X devices 408, other vehicles 404, 406, etc., indicative of a possible obstruction. The data can also comprise data from vehicle 105 sensors 115, such as sensor 322 or image sensor 302 within the sensor assembly 202 indicative of a possible obstruction. The data can also comprise vehicle operating parameters, such as current weather conditions, future weather conditions, current vehicle 105 location, sensor assembly 202 parameters, e.g., temperature, or the like.

At block 910, a determination can be made whether a pixel obstruction value of an image frame received from the image sensor 302 is greater than a pixel obstruction threshold. In an example implementation, the computer 110 can determine that one or more pixels represent an obstruction based on the output 735 from the DNN 500 and calculate a number of pixels obstructed or partially obstructed. The computer 110 can calculate the total number of pixels that are obstructed or partially obstructed according to the output 735 that indicates a probability whether a particular pixel is obstructed or partially obstructed. The number of pixels obstructed or partially obstructed can represent the pixel obstruction value. The predetermined pixel obstruction threshold may be defined by a manufacturer of the image sensor 302 based on empirical testing of image sensor 302 quality as a function of number of pixels obstructed or partially obstructed where objects can or cannot be reliably identified by sensor 302 data. If the pixel obstruction value is greater than or equal to the pixel obstruction threshold, the computer 110 initiates a pixel obstruction cleaning protocol at block 915. For example, the computer 110 can transmit control signals to the actuator 316 to initiate the cleaning device 314 according to a pixel obstruction cleaning protocol defined by the vehicle 105 manufacturer. The pixel obstruction cleaning protocol defines a cleaning operation, such as disperse fluid and/or initiate the wipers for a particular time period. The process 900 can then return to block 905. It is to be understood that blocks 905, 910, and 915 can be optional and that process 900 can begin at block 920 when blocks 905, 910, and 915 are omitted.

If the pixel obstruction value is less than the pixel obstruction threshold, or alternatively, to begin the process 900, the image processor 310 determines whether to access one or more profiles 326 based on the vehicle operating parameters at block 920. A DNN 500 can receive vehicle operating parameters, such as weather conditions (e.g., ambient temperature, absence of precipitation, humidity, presence of precipitation, etc.), city infrastructure, future weather conditions, duration and/or time period of a route to be traversed, day of the year, or the like, and output a profile 326 according to the vehicle operating parameters that define a cleaning and/or cooling protocol. The image processor 310 or the computer 110 can also receive vehicle 105 location data and compare the location data with one or more maps corresponding to the vehicle 105 location. The maps can include geographic operating parameters, such as whether the vehicle 105 is located within a city, on a highway, an urban environment or within a rural environment. For example, the image processor 310 or the computer 110 may access a current location of the vehicle 105 and cross-reference the current vehicle 105 location with the corresponding coordinates within the map to determine a location of the vehicle 105. Further, the map may include map metadata defining the environment at the map coordinates corresponding to the vehicle location, e.g., as urban, suburban, rural, etc. The computer 110 determines whether to access one or more profiles 326 based on the vehicle environment data at block 920. That is, a DNN 500 can receive vehicle environment data, such as weather conditions, vehicle location, future weather conditions, duration and/or time period of the route, day of the year, or the like, and output a profile 326 according to the vehicle environment data that defines a cleaning and/or cooling protocol. The computer 110 can also receive vehicle 105 location data and compare the location data with one or more maps corresponding to the vehicle 105 location. The maps can include environmental data, such as whether the vehicle 105 is located within a city, on a highway, an urban environment, or within a rural environment. For example, the image the computer 110 may access a current location of the vehicle 105 and cross-reference the current vehicle 105 location with the corresponding coordinates within the map to determine an environment the vehicle 105 is traversing. For example, the map may include map metadata defining the environment at the map coordinates.

The one or more profiles 326 may include a predefined cleaning and/or cooling protocol based on the operating parameters. For example, one profile 326 may define a cleaning protocol and/or cooling protocol when the vehicle 105 is on a highway, another profile 326 may define a cleaning protocol and/or cooling protocol when the vehicle 105 is located within a city, and another profile 326 may define a cleaning protocol and/or cooling protocol when the vehicle 105 is within a rural environment as grouped by the DNN 500. In some instances, when accessed by the computer 110, the profile 326 may cause the image computer 110 to initiate the cleaning and/or cooling protocol based on the external data. For example, a V2X device 408 associated with a traffic light may send traffic light data to the vehicle 105, and the computer 110 can initiate the cleaning and/or cooling protocol in response to the traffic light data, e.g., initiate a cleaning and/or cooling protocol in response to receiving traffic light data indicating the traffic light is red.

Each profile 326 may include a cleaning protocol and/or a cooling protocol that differs with respect to a cleaning protocol and/or a cooling protocol of other profiles. For instance, a duty-cycle and/or a pulse-width-modulation set within a first profile 326 may differ with respect to a duty-cycle and/or a pulse-width-modulation set with a second profile 326. The profiles can be set by the vehicle 105 manufacturer and/or vehicle 105 operator. The profile(s) 326 may also be updated by the vehicle 105 manufacturer via the server 145. For example, additional data can be provided to the DNN 500 for training purposes for updating, and the updated DNN 500 can be transmitted to the vehicle 105.

If the computer 110 determines that no profile 326 is output for the operating parameters input, the computer 110 sends control signals to the actuators 316, 320 to initiate the cleaning device 314 and the cooling device 318 according to an unknown environment cleaning protocol at block 925. The unknown environment cleaning protocol can be defined as a predetermined cleaning and/or cooling sequence set by the vehicle 105 manufacturer.

Otherwise, if the computer 110 determines that the vehicle 105 location does an environment within the one or more profiles 326, the computer 110 initiates a cleaning and/or cooling protocol according to the profile 326 based on the vehicle 105 location and/or external data provided to the DNN 500 at block 930. The process 900 then ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Intercal, Visual Basic, Java Script, Perl, Python, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above. Some additional examples of databases may include NoSQL and/or graph databases (GDB).

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
    input data about operating parameters external to a vehicle to a neural network that outputs at least one profile defining at least one of a cleaning protocol or a cooling protocol for a vehicle sensor, wherein the operating parameters include one or more of current weather conditions, future weather conditions, images indicative of a current weather condition, city infrastructure, duration of a route to be traversed, a time period to traverse the route, and vehicle location; and
    initiate operation of at least one of a cleaning device or a cooling device according to the at least one of the cleaning protocol or the cooling protocol when the operating parameters correspond to the at least one profile.

2. The system of claim 1, wherein the processor is further programed to:
    determine, via a deep neural network, whether a pixel obstruction value of an image frame is greater than or equal to a pixel obstruction threshold; and
    initiate operation of the cleaning device according to a pixel obstruction cleaning protocol when the pixel obstruction value is greater than or equal to the pixel obstruction threshold.

3. The system of claim 2, wherein the processor is further programmed to determine the pixel obstruction value by calculating a number of pixels that are classified as obstructed or at least partially obstructed.

4. The system of claim 2, wherein the deep neural network comprises a convolutional neural network.

5. The system of claim 2, further comprising a sensor assembly including an image sensor, wherein the image sensor generates the image frame.

6. The system of claim 5, wherein the sensor assembly is disposed over a roof of the vehicle.

7. The system of claim 5, wherein the image sensor comprises an electronic depth camera.

8. The system of claim 1, wherein the processor is further programmed to initiate operation of at least one of the cleaning device or the cooling device according to an unknown environment cleaning protocol when the vehicle location does not correspond to the at least one profile.

9. The system of claim 1, wherein the processor is further programmed to determine whether the vehicle location corresponds to at least one profile by cross-referencing a current location of the vehicle with corresponding map coordinates; and determine the operating parameter based on map metadata corresponding to the corresponding map coordinates.

10. The system of claim 1, wherein the processor is further programmed to receive an image from a V2X device.

11. The system of claim 10, wherein the V2X device comprises a vehicle-to-infrastructure (V2I) device.

12. A method comprising:
    inputting data about operating parameters external to a vehicle to a neural network that outputs at least one profile defining at least one of a cleaning protocol or a cooling protocol for a vehicle sensor, wherein the operating parameters include one or more of current weather conditions, future weather conditions, images indicative of a current weather condition, city infrastructure, duration of a route to be traversed, a time period to traverse the route, and vehicle location; and
    initiating operation of at least one of a cleaning device or a cooling device according to the at least one of the cleaning protocol or the cooling protocol when the operating parameters correspond to the at least one profile.

13. The method of claim 12, further comprising:
    determining, via a deep neural network, whether a pixel obstruction value of an image frame is greater than or equal to a pixel obstruction threshold; and
    initiating operation of the cleaning device according to a pixel obstruction cleaning protocol when the pixel obstruction value is greater than or equal to the pixel obstruction threshold.

14. The method of claim 13, further comprising determining the pixel obstruction value by calculating a number of pixels that are classified as obstructed or at least partially obstructed.

15. The method of claim 13, wherein the deep neural network comprises a convolutional neural network.

16. The method of claim 12, further comprising initiating operation of at least one of the cleaning device or the cooling device according to an unknown environment cleaning protocol when the vehicle location does not correspond to the at least one profile.

17. The method of claim 12, wherein the operating parameters comprise at least one of: a time of year or a duration of a route of the vehicle.

18. The method of claim 12, further comprising: determining whether the vehicle location corresponds to at least one profile by cross-referencing a current location of the vehicle with corresponding map coordinates; and determining the operating parameters based on map metadata corresponding to the corresponding map coordinates.

19. The method of claim 12, further comprising receiving an image from a V2X device.

20. The method of claim 19, wherein the V2X device comprises a vehicle-to-infrastructure (V2I) device.

* * * * *